(12) United States Patent
Park et al.

(10) Patent No.: US 10,269,492 B2
(45) Date of Patent: Apr. 23, 2019

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Kum Jin Park, Suwon-Si (KR); Chang Hak Choi, Suwon-Si (KR); Chi Hwa Lee, Suwon-Si (KR); Min Gi Sin, Suwon-Si (KR); Woo Sup Kim, Suwon-Si (KR); Jong Hoon Yoo, Suwon-Si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 353 days.

(21) Appl. No.: 14/799,461

(22) Filed: Jul. 14, 2015

(65) Prior Publication Data

US 2016/0181019 A1 Jun. 23, 2016

(30) Foreign Application Priority Data

Dec. 23, 2014 (KR) .................. 10-2014-0187399

(51) Int. Cl.
*H01G 4/008* (2006.01)
*H01G 4/12* (2006.01)
(Continued)

(52) U.S. Cl.
CPC ............ *H01G 4/30* (2013.01); *C04B 35/4682* (2013.01); *H01G 4/12* (2013.01); *H01G 4/1227* (2013.01);
(Continued)

(58) Field of Classification Search
CPC ...... H01G 4/30; H01G 44/1227; H01G 4/008; H01G 4/005; H01G 4/012
See application file for complete search history.

(56) References Cited

U.S. PATENT DOCUMENTS

| | | | | |
|---|---|---|---|---|
| 8,737,037 B2 * | 5/2014 | Kim | .................. | H01G 4/0085 361/305 |
| 2001/0055193 A1 * | 12/2001 | Chazono | .............. | H01G 4/1209 361/311 |

(Continued)

FOREIGN PATENT DOCUMENTS

| CN | 101607819 A | 12/2009 |
|---|---|---|
| CN | 102969154 A | 3/2013 |

(Continued)

OTHER PUBLICATIONS

Notice of Office Action Korean Patent Application No. 10-2014-0187399 dated Mar. 8, 2016 with full English translation.

(Continued)

*Primary Examiner* — Eric W Thomas
(74) *Attorney, Agent, or Firm* — Morgan Lewis & Bockius LLP

(57) ABSTRACT

A multilayer ceramic electronic component and a method of manufacturing the same are provided. The multilayer ceramic electronic component includes: a ceramic body including dielectric layers; and internal electrodes disposed on the dielectric layers within the ceramic body and containing a ceramic material trapped therein. The ceramic material is a dielectric material doped with an additive.

34 Claims, 6 Drawing Sheets

(51) Int. Cl.
*H01G 4/30* (2006.01)
*C04B 35/468* (2006.01)

(52) U.S. Cl.
CPC ........... *C04B 2235/3208* (2013.01); *C04B 2235/3224* (2013.01); *C04B 2235/5454* (2013.01); *C04B 2235/6025* (2013.01)

(56) References Cited

U.S. PATENT DOCUMENTS

| | | | |
|---|---|---|---|
| 2002/0075632 A1 | 6/2002 | Nakano et al. | |
| 2005/0152095 A1 | 7/2005 | Nakano et al. | |
| 2006/0198078 A1* | 9/2006 | Miyauchi ............... | H01G 4/008 361/305 |
| 2006/0208575 A1 | 9/2006 | Orimo et al. | |
| 2012/0276372 A1* | 11/2012 | Lee ........................ | H01G 4/008 428/336 |
| 2013/0049532 A1* | 2/2013 | Kim ........................ | H01G 4/30 310/311 |
| 2013/0062578 A1 | 3/2013 | Park et al. | |

FOREIGN PATENT DOCUMENTS

| | | |
|---|---|---|
| CN | 1877763 A | 12/2016 |
| JP | 2002-305124 A | 10/2002 |
| JP | 2003-068559 A | 3/2003 |
| JP | 2003-100544 A | 4/2003 |
| JP | 2005-223313 A | 8/2005 |
| JP | 2005-302977 A | 10/2005 |
| JP | 2006-206362 A | 8/2006 |
| JP | 2006-319205 A | 11/2006 |
| JP | 2007-258476 A | 10/2007 |
| JP | 2009-260200 A | 11/2009 |
| JP | 2010-257937 A | 11/2010 |
| JP | 2013-055314 A | 3/2013 |
| KR | 1999-0075846 A | 10/1999 |
| KR | 10-2013-0024530 A | 3/2013 |

OTHER PUBLICATIONS

Chinese Office Action dated May 25, 2018 issued in Chinese Patent Application No. 201510483127.8 (with English translation).
Japanese Office Action dated Jul. 17, 2018 issued in Japanese Patent Application No. 2015-141471 (with English translation).
Second Office Action issued in Chinese Application No. 201510483127.8 dated Jan. 14, 2019, with English translation.

* cited by examiner

A-A`

MULTILAYER CERAMIC ELECTRONIC COMPONENT AND METHOD OF MANUFACTURING THE SAME

CROSS-REFERENCE TO RELATED APPLICATION

This application claims the priority and benefit of Korean Patent Application No. 10-2014-0187399 filed on Dec. 23, 2014, with the Korean Intellectual Property Office, the disclosure of which is incorporated herein by reference.

BACKGROUND

The present disclosure relates to a multilayer ceramic electronic component and a method of manufacturing the same.

Electronic components using a ceramic material, such as capacitors, inductors, piezoelectric elements, varistors, thermistors, and the like, may include a ceramic body formed of a ceramic material, internal electrodes formed in the interior of the ceramic body, and external electrodes provided on a surface or surfaces of the ceramic body to be connected to the internal electrodes.

Among such electronic components, a multilayer ceramic capacitor is generally manufactured by stacking green sheets formed of a dielectric paste using a sheet formation method along with internal electrode patterns formed on the sheets by a printing method, or the like, and then sintering the stacked body.

In multilayer ceramic capacitors according to the related art, barium titanate ($BaTiO_3$)-based dielectric materials have commonly been used.

In accordance with the electronization of many functions of devices used in fields requiring high degrees of reliability and an increase in demand for such devices, it is essential for multilayer ceramic electronic components intended for use in such devices to be highly reliable.

In accordance with the ongoing technological development of multilayer ceramic electronic components, the manner in which high levels of capacitance and high degree of reliability are realized therein has become a significant issue.

RELATED ART DOCUMENT (Patent Document 1) Korean Patent Laid-Open Publication No. 1999-0075846

SUMMARY

An aspect of the present disclosure provides a multilayer ceramic electronic component and a method of manufacturing the same.

According to an aspect of the present disclosure, a multilayer ceramic electronic component includes alternating internal electrodes and dielectric layers. The internal electrodes contain a ceramic material trapped therein. The ceramic material is a dielectric material doped with an additive. Occurrence of insulation deterioration may be suppressed and long-term reliability may be improved by the multilayer ceramic electronic component. A method of manufacturing the same may also be provided.

According to another aspect of the present disclosure, a multilayer ceramic electronic component is provided in which a concentration of an additive is higher in the vicinity of interfaces between dielectric layers and internal electrodes than in the vicinity of the centers of the dielectric layers in a thickness direction thereof. Reliability may be improved and low dielectric loss and high permittivity may be obtained by the multilayer ceramic electronic component. A method of manufacturing the same may also be provided.

According to another aspect of the present disclosure, a multilayer ceramic electronic component is provided comprising a plurality of dielectric layers. The dielectric layers comprise a plurality of grains having a core-shell structure. Internal electrodes are disposed on the dielectric layers. The internal electrodes contain a ceramic material trapped therein. The ceramic material is a dielectric material doped with an additive.

BRIEF DESCRIPTION OF DRAWINGS

The above and other aspects, features and advantages of the present disclosure will be more clearly understood from the following detailed description taken in conjunction with the accompanying drawings.

DETAILED DESCRIPTION

Figure 1:
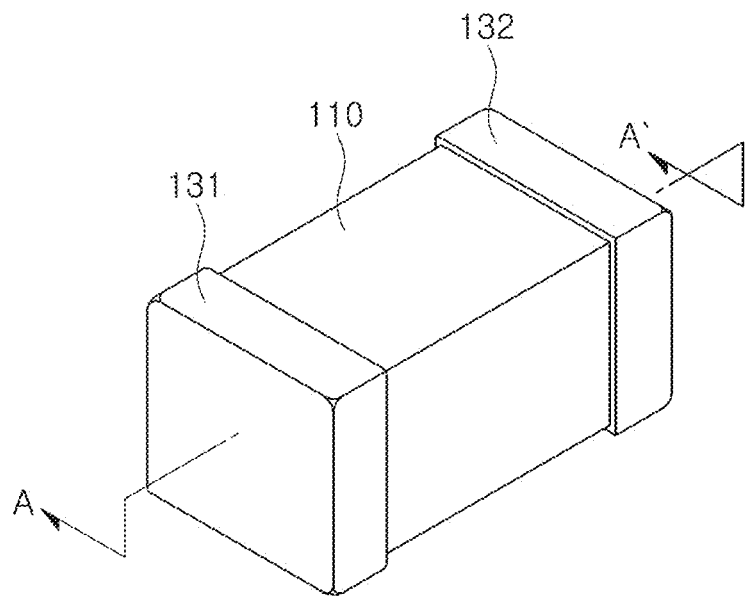
FIG. 1 is a perspective view illustrating a multilayer ceramic electronic component according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
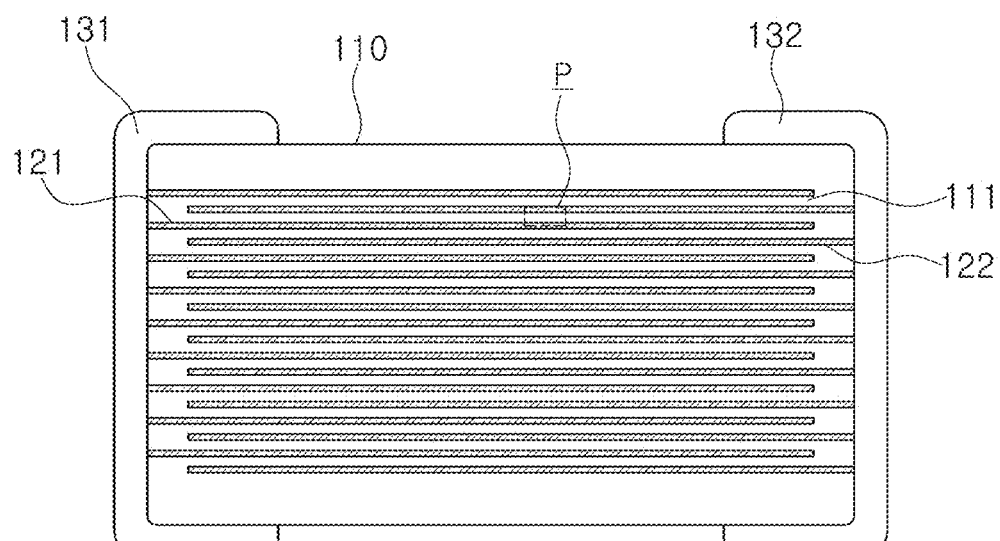
FIG. 2 is a cross-sectional view taken along line A-A' of FIG. 1.

FIG. 1 is a schematic perspective view illustrating a multilayer ceramic electronic component 100 according to an exemplary embodiment of the present disclosure, and FIG. 2 is a schematic cross-sectional view of the multilayer ceramic electronic component 100 taken along line A-A' of FIG. 1.

Referring to FIGS. 1 and 2, the multilayer ceramic electronic component 100 according to the exemplary embodiment of the present disclosure may include a ceramic body 110 and external electrodes 131 and 132 disposed on outer surfaces of the ceramic body.

The ceramic body 110 may include an active part contributing to capacitance formation, and upper and lower cover parts formed above and below the active part and provided as upper and lower margin parts, respectively. The active part may include dielectric layers 111 and internal electrodes 121 and 122, and may be formed by stacking the dielectric layers 111 on which internal electrode patterns are printed.

In the exemplary embodiment, the shape of the ceramic body 110 is not particularly limited, but may be substantially hexahedral. Due to sintering shrinkage of ceramic powder at the time of sintering a chip, a thickness differential with respect to the presence or absence of internal electrode patterns and the polishing of edge portions of the ceramic body, the ceramic body 110 may have a substantially hexahedral shape, rather than a completely hexahedral shape.

The internal electrodes 121 and 122 and the dielectric layers 111 may be alternately stacked, and the internal electrodes 121 and 122 may be electrically insulated from each other by the dielectric layers 111 disposed therebetween.

The internal electrodes 121 and 122 may include first internal electrodes 121 and second internal electrodes 122, alternately provided on the respective dielectric layers.

The thicknesses and the number of internal electrodes 121 and 122 may be determined depending on use of the electronic component.

The internal electrodes 121 and 122 may contain nickel (Ni), copper (Cu), palladium (Pd), or an alloy thereof, but are not limited thereto.

A conductive material contained in the first and second internal electrodes 121 and 122 is not particularly limited, but may be nickel (Ni).

The dielectric layer 111 may contain a high-k ceramic composition, for example, a barium titanate ($BaTiO_3$)-based dielectric material.

The barium titanate ($BaTiO_3$)-based dielectric material may be understood to include pure barium titanate or a compound in which a Ba site (A site) and a Ti site (B site) of barium titanate are doped with different additives.

Figure 3:
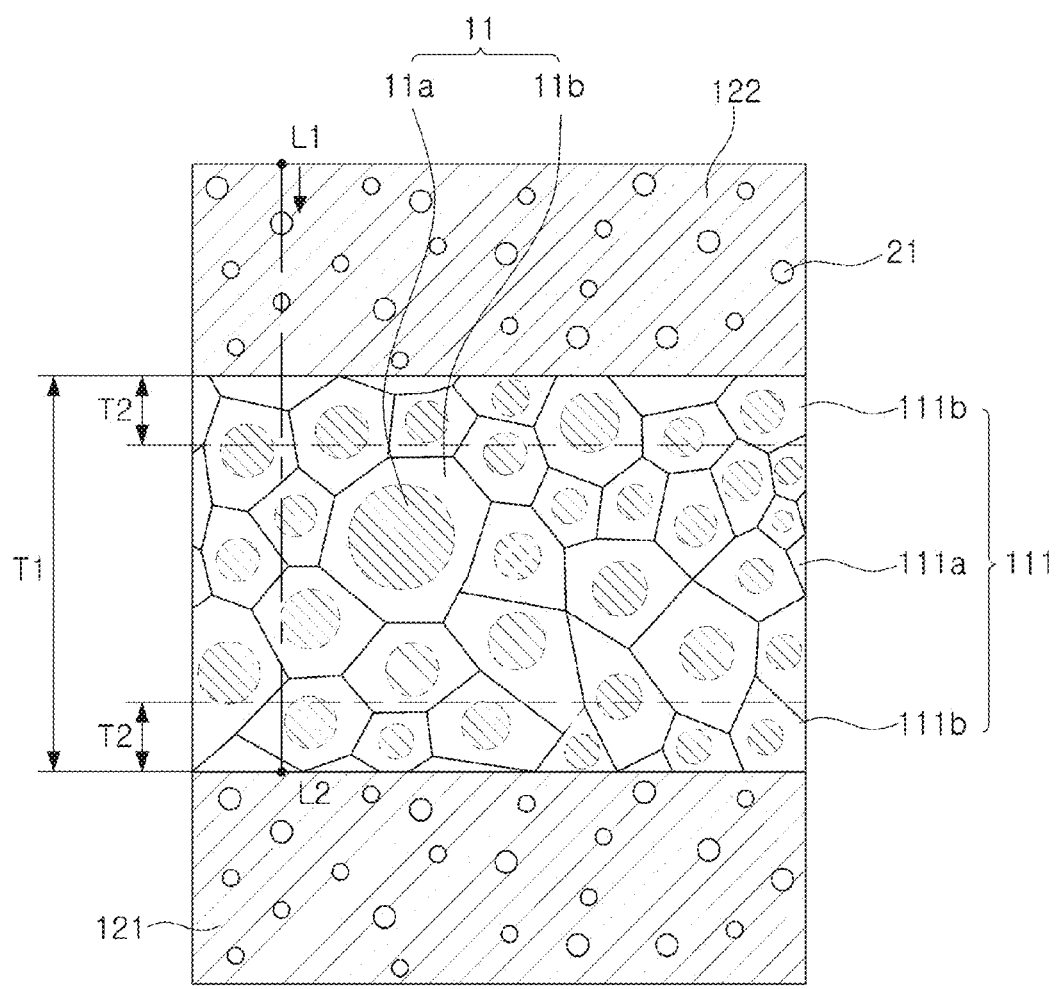
FIG. 3 is an enlarged view of region P of FIG. 2.

FIG. 3 is an enlarged view of region P of FIG. 2.

As illustrated in FIG. 3, according to the exemplary embodiment, the internal electrodes 121 and 122 may contain a ceramic material 21 trapped therein.

The ceramic material 21, which is a dielectric material doped with an additive, may be, for example, a barium titanate-based dielectric material doped with the additive.

According to the exemplary embodiment, the ceramic material 21 trapped in the internal electrodes 121 and 122 may be doped with the additive, and thus reduction resistance and insulating characteristics thereof after sintering may be improved, as compared with a pure barium titanate-based dielectric material.

The reduction resistance and the insulating characteristics of the ceramic material 21 trapped in the internal electrodes 121 and 122 may be improved to thereby suppress an overcurrent situation from occurring in the internal electrodes and prevent the internal electrodes from being fused and disconnected even in the case that the internal electrodes are overheated, and thus insulation deterioration may be prevented, whereby long-term reliability of the multilayer ceramic electronic component may be secured.

The additive may be one or more elements selected from the group consisting of calcium (Ca), valence acceptor elements, and rare earth elements.

The valence acceptor elements may include at least one of magnesium (Mg) and manganese (Mn), while the rare earth elements may include at least one of yttrium (Y), gadolinium (Gd), dysprosium (Dy), holmium (Ho), europium (Eu), erbium (Er), and ytterbium (Yb).

As described below in detail, according to the exemplary embodiment, a composition of the dielectric layer 111 may be adjusted through the additive composition of the ceramic material 21 contained in the internal electrodes 121 and 122.

Therefore, the additive may be appropriately selected in order to improve physical properties of the dielectric layer 111.

For example, the ceramic material 21 may be a dielectric material co-doped with calcium (Ca) and at least one of the valence acceptor elements.

Alternatively, the ceramic material 21 may be a dielectric material co-doped with calcium (Ca) and at least one of the rare earth elements or may be a dielectric material co-doped with at least one of the valence acceptor elements and at least one of the rare earth elements.

Alternatively, the ceramic material 21 may be a dielectric material co-doped with calcium (Ca), at least one of the valence acceptor elements, and at least one of the rare earth elements.

According to the exemplary embodiment, a cross-sectional area of the internal electrodes 121 and 122 which is occupied by the ceramic material 21 may be equal to 3% to 20% of an overall cross-sectional area of the internal electrodes 121 and 122.

In a case in which the area occupied by the ceramic material is equal to 3% or less of the overall area of the internal electrodes, an effect of decreasing the occurrence of insulation deterioration may be insignificant. In a case in which the area occupied by the ceramic material is equal to 20% or more of the overall area of the internal electrodes, an increase in non-conductive regions in the internal electrodes may result in decreased connectivity of the internal electrodes, whereby capacitance may be decreased.

According to the exemplary embodiment, the dielectric layer 111 may contain the same additive as the additive contained in the ceramic material 21, and the additive in the dielectric layer may have a concentration gradient in a thickness direction of the dielectric layer.

For example, a concentration of the additive may be gradually decreased from portions of the dielectric layer adjacent interfaces between the dielectric layer and the internal electrodes toward a central portion of the dielectric layer in the thickness direction thereof.

A ceramic material contained in the internal electrode paste escapes from the internal electrode paste during a sintering process and forms a portion of the dielectric layer, and thus, the dielectric layer may contain the additive.

Therefore, the concentration of the additive in the dielectric layer 111 may be higher in the vicinity of the interfaces between the dielectric layer 111 and the internal electrodes 121 and 122 (the portions of the dielectric layer adjacent the internal electrodes) than in the central portion of the dielectric layer in the thickness direction thereof.

For example, as illustrated in FIG. 3, the dielectric layer 111 may include interface portions 111b adjacent the internal electrodes 121 and 122 and a central portion 111a disposed between the interface portions 111b, and the concentration of the additive may be higher in the interface portions than in the central portion.

The interface portions 111b and the central portion 111a are not distinguished from each other within the dielectric layer, but may be formed integrally with each other and be distinguishable from each other by distances thereof from the internal electrodes.

In the exemplary embodiment, the interface portion 111b may be defined as a region within 20% of an overall thickness of the dielectric layer from the interface between the internal electrode and the dielectric layer.

A thickness T2 of the interface portion 111b may be 20% of a thickness T1 of the dielectric layer 111.

The barium titanate ($BaTiO_3$) used as a material of the dielectric layer may have high-k characteristics, but may also have poor reduction resistance, and thus, it may be difficult to secure reliability in a case in which the dielectric layer and the internal electrodes are thinned.

In addition, when a dielectric layer containing an additive in order to improve reduction resistance and reliability of the dielectric layer, permittivity may be decreased, while a dielectric loss factor (DF) may be increased.

Therefore, in the exemplary embodiment, the additive is not uniformly contained in the thickness direction of the dielectric layer, and the concentration thereof may be higher in the interface portions of the dielectric layer adjacent the internal electrodes.

Insulation deterioration caused by damage to the dielectric layer at the time of using the multilayer ceramic electronic component may be due mainly to oxygen vacancies accumulated in the interface portions of the dielectric layer adjacent the internal electrodes. Therefore, when the additive for improving the reduction resistance and the reliability of the barium titanate is mainly present in the interface portions 111b of the dielectric layer as in the exemplary embodiment of the present disclosure, the reliability of the multilayer ceramic electronic component may be improved while high permittivity and low dielectric loss may be secured.

In addition, according to the exemplary embodiment, by increasing the concentration of the additive in the interface portion corresponding to 20% of the overall thickness of the dielectric layer from the interface between the dielectric layer and the internal electrode in which the oxygen vacancies are mainly accumulated, the reliability of the multilayer ceramic electronic component may be improved while high permittivity and low dielectric loss may be efficiently secured.

According to the exemplary embodiment, the additive may be mainly contained in the interface portions 111b of the dielectric layer 111, such that the concentration of the additive may be higher in the interface portions 111b of the dielectric layer than in the central portion 111a thereof.

As in the exemplary embodiment of the present disclosure, the additive is not uniformly contained in the dielectric layer, but may be concentrated in the interface portions 111b rather than in the central portion 111a. As a result, the multilayer ceramic electronic component may have improved reliability while preventing a decrease in permittivity and lowering the dielectric loss.

As described below, in a method of manufacturing a multilayer ceramic electronic component, the dielectric layers 111 and the internal electrodes 121 and 122 may be formed by applying internal electrode paste to ceramic green sheets forming the dielectric layers, stacking the ceramic green sheets onto which the internal electrode paste is applied to form a multilayer body, and then sintering the multilayer body.

According to the exemplary embodiment of the present disclosure, the internal electrode paste for forming the internal electrodes may contain the ceramic material doped with the additive, such that the concentration of the additive may be higher in the interface portions of the dielectric layer adjacent the internal electrodes than in the central portion of the dielectric layer.

The ceramic material contained in the internal electrode paste may escape from the internal electrodes, during the sintering process of the multilayer body including the ceramic green sheets onto which the internal electrode paste is applied, and then move to the ceramic green sheets to form portions of the dielectric layers. Here, the ceramic material may be mainly disposed in the interface portions of the dielectric layers adjacent the internal electrodes.

According to the exemplary embodiment, the ceramic material contained in the internal electrode paste may contain the dielectric material doped with the additive, such that the additive may be more uniformly distributed in the interface portions of the dielectric layer as compared to when a separate additive is added to the internal electrode paste without doping the ceramic material with the additive or when the ceramic material of which a surface is coated with the additive is added to the internal electrode paste.

Unlike the exemplary embodiment of the present disclosure, when the additive is separately present in the ceramic material without being doped in a barium titanate-based compound, the additive may not be completely dissolved in the ceramic material or base material forming the dielectric layers in the sintering process of the internal electrodes, resulting in segregation. In this case, a secondary phase may be formed decreasing the connectivity of the internal electrodes and deteriorating electrical characteristics in the dielectric material, causing decreases in capacitance and reliability of the multilayer ceramic electronic component.

However, when using the dielectric material doped with the additive as the ceramic material having a higher sintering temperature than the internal electrode paste as in the exemplary embodiment of the present disclosure, the segregation and the secondary phase may be suppressed in the sintering process of the internal electrodes, whereby the decrease in the capacitance of the multilayer ceramic electronic component may be prevented while the reliability of the multilayer ceramic electronic component may be improved.

In addition, the ceramic material moving to the interfaces between the internal electrodes and the ceramic green sheets in the sintering process together with the compound contained in the ceramic green sheets may form the dielectric layers thereby lowering dielectric loss of the dielectric layer and improving reliability of the dielectric layer.

The additive may be at least one selected from the group consisting of calcium (Ca), the valence acceptor elements, and the rare earth elements.

The valence acceptor elements may include at least one of magnesium (Mg) and manganese (Mn), and the rare earth elements may include at least one of yttrium (Y), gadolinium (Gd), dysprosium (Dy), holmium (Ho), europium (Eu), erbium (Er), and ytterbium (Yb).

In a case in which the ceramic material 21 is doped with calcium (Ca), reduction resistance may increase, and movement of the oxygen vacancies may be suppressed to improve reliability.

When the ceramic material 21 is doped with at least one of the valence acceptor elements (Mg and Mn), a phenomenon in which the dielectric material is reduced to be semiconductive at the time of performing sintering under a reduction atmosphere, may be prevented.

In a case in which the ceramic material 21 is doped with at least one of the rare earth elements (Y, Gd, Dy, Ho, Eu, Er, and Yb), the rare earth element may be substituted in the A site and the B site of the barium titanate-based dielectric material, such that balance may be maintained during the sintering. Therefore, the reliability of the multilayer ceramic electronic component may be improved.

According to the exemplary embodiment, as illustrated in FIG. 3, the dielectric layer may contain dielectric grains 11, each of which has a core-shell structure including a core portion 11a and a shell portion 11b enclosing the core portion.

According to the exemplary embodiment, a content of the additive in the dielectric grains contained in the interface portions may be higher in the shell portions than in the core portions.

According to the exemplary embodiment, the dielectric layer 111 may be formed of a single layer of dielectric grains in the thickness direction, and in this case, the content of the additive may be higher in the shell portions than in the core portions. However, the present inventive concept is not limited thereto.

In addition, when the dielectric layer is formed of a single layer of dielectric grains, the content of the additive may be higher in regions of the shell portions corresponding to the interface portions of the dielectric layer than in regions of the shell portions included in the central portion of the dielectric layer.

As described above, when the ceramic material contained in the internal electrode paste moves to the interfaces between the internal electrodes and the ceramic green sheets in the sintering process to form the dielectric layers, the dielectric material doped with the additive forming the ceramic material may enclose dielectric powder particles contained in the ceramic green sheets to form the shell portions of the dielectric grains.

Therefore, according to the exemplary embodiment, the shell portions of the dielectric grains contained in the interface portions 111b may contain the dielectric material doped with the additive, and the content of the additive may be higher in the shell portions of the dielectric grains contained in the interface portions of the dielectric layer than in the core portions of the dielectric grains.

The ceramic material that does not escape from the internal electrode paste in the sintering process of the internal electrode paste and the ceramic green sheets may remain in the internal electrodes after the sintering process to decrease the occurrence of insulation deterioration.

According to the exemplary embodiment, the ceramic material trapped in the internal electrodes after the sintering process may have an average particle size of 1 to 200 nm.

Referring to FIGS. 1 and 2, the upper and lower cover parts included in the ceramic body may be formed by stacking a single dielectric layer or two or more dielectric layers on upper and lower surfaces of the active part, respectively, and may serve to prevent damage to the internal electrodes 121 and 122 due to physical or chemical stress.

The first and second external electrodes 131 and 132 may be disposed on both end portions of the ceramic body 110, respectively, and may be electrically connected to exposed end portions of the first and second internal electrodes 121 and 122, respectively, to configure a capacitor circuit.

The external electrodes may contain copper (Cu) as a conductive material. The external electrodes 131 and 132 may further contain glass, but are not limited thereto. The external electrodes 131 and 132 may be formed of external electrode paste containing a conductive material and glass, but are not limited thereto. Here, glass frit may be contained in the external electrode paste.

The external electrodes may be formed by sintering the external electrode paste.

According to the exemplary embodiment, a multilayer ceramic electronic component having high capacitance, low dielectric loss, and excellent reliability may be provided by including dielectric layers having different concentrations of calcium in the thickness direction.

Figure 4A:
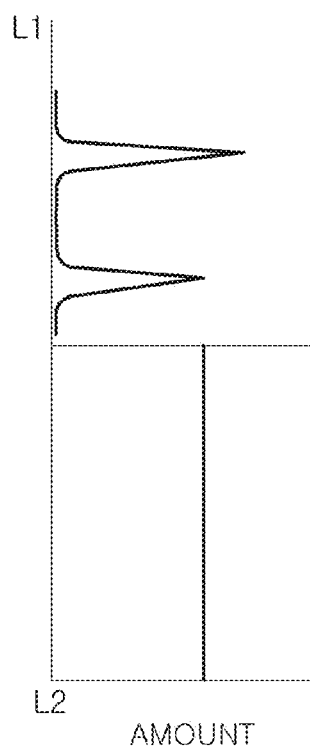
FIGS. 4A through 4C are graphs schematically illustrating concentration distributions of a base material (main component) and an additive contained in the multilayer ceramic electronic component according to the exemplary embodiment of the present disclosure, on line L1-L2 of FIG. 3, in order to explain concentrations of the base material and the additive.
Figure 4B:
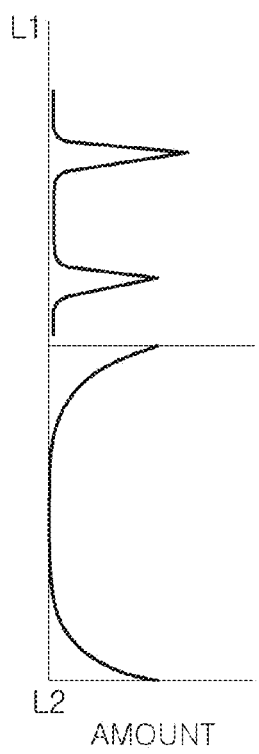
Figure 4C:
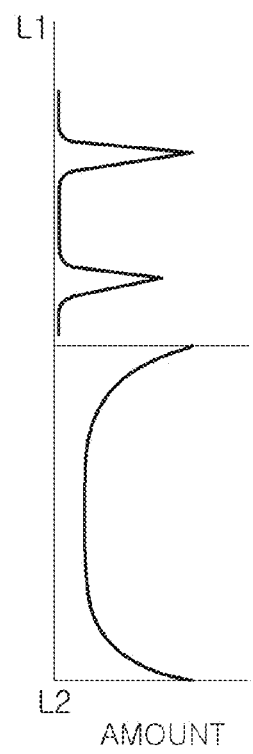

FIGS. 4A through 4C are graphs schematically illustrating concentration distributions of a base material (a main component) and an additive contained in the multilayer ceramic electronic component according to the exemplary embodiment of the present disclosure, on line L1-L2 of FIG. 3, in order to explain the concentrations of the base material and the additive.

FIG. 4A illustrates a concentration distribution of elements contained in the base material. The elements of the base material may be barium (Ba) and titanium (Ti).

As illustrated in FIG. 4A, it may be confirmed that the dielectric layer contains the elements of the base material which are relatively uniformly distributed, and the elements of the base material are found in regions of the internal electrodes in which the ceramic material is trapped.

FIG. 4B illustrates a concentration distribution of the additive which is contained in the ceramic material added to the internal electrode paste and is not contained in dielectric slurry (or the ceramic green sheets) for forming the dielectric layers.

In this case, as illustrated in FIG. 4B, the additive may be found in the regions of the internal electrodes in which the ceramic material is trapped, and may be found in the interface portions of the dielectric layer. Here, the additive may not be found in the central portion of the dielectric layer in the thickness direction thereof or a very small amount of the additive may be found in the central portion of the dielectric layer in the thickness direction thereof.

Since the ceramic material contained in the internal electrode paste escapes from the internal electrode paste in the sintering process to form portions of the interface portions of the dielectric layer, the additive may be found in the interface portions of the dielectric layer.

FIG. 4C illustrates a concentration distribution of the additive which is contained in the ceramic material added to the internal electrode paste and is also contained in the dielectric slurry (or the ceramic green sheets) for forming the dielectric layers.

In this case, as illustrated in FIG. 4C, the additive may be found in the regions of the internal electrodes in which the ceramic material is trapped, and may also be found within the dielectric layer.

However, unlike the case of FIG. 4B, since the additive is also contained in the dielectric slurry before the sintering process, the additive may be found in the central portion of the dielectric layer in the thickness direction thereof.

However, since the concentration of the additive contained in the ceramic material added to the internal electrode paste is higher than that of the additive contained in the dielectric slurry before the sintering process, when a portion of the ceramic material contained in the internal electrode paste forms the interface portions of the dielectric layer, the concentration of the additive in the interface portions of the dielectric layer may be higher than that of the additive in the central portion of the dielectric layer.

In addition, in the cases of FIGS. 4B and 4C, an average concentration of the additive contained in the ceramic material may be higher than that of the additive contained in the dielectric layer after the sintering process.

Figure 5:
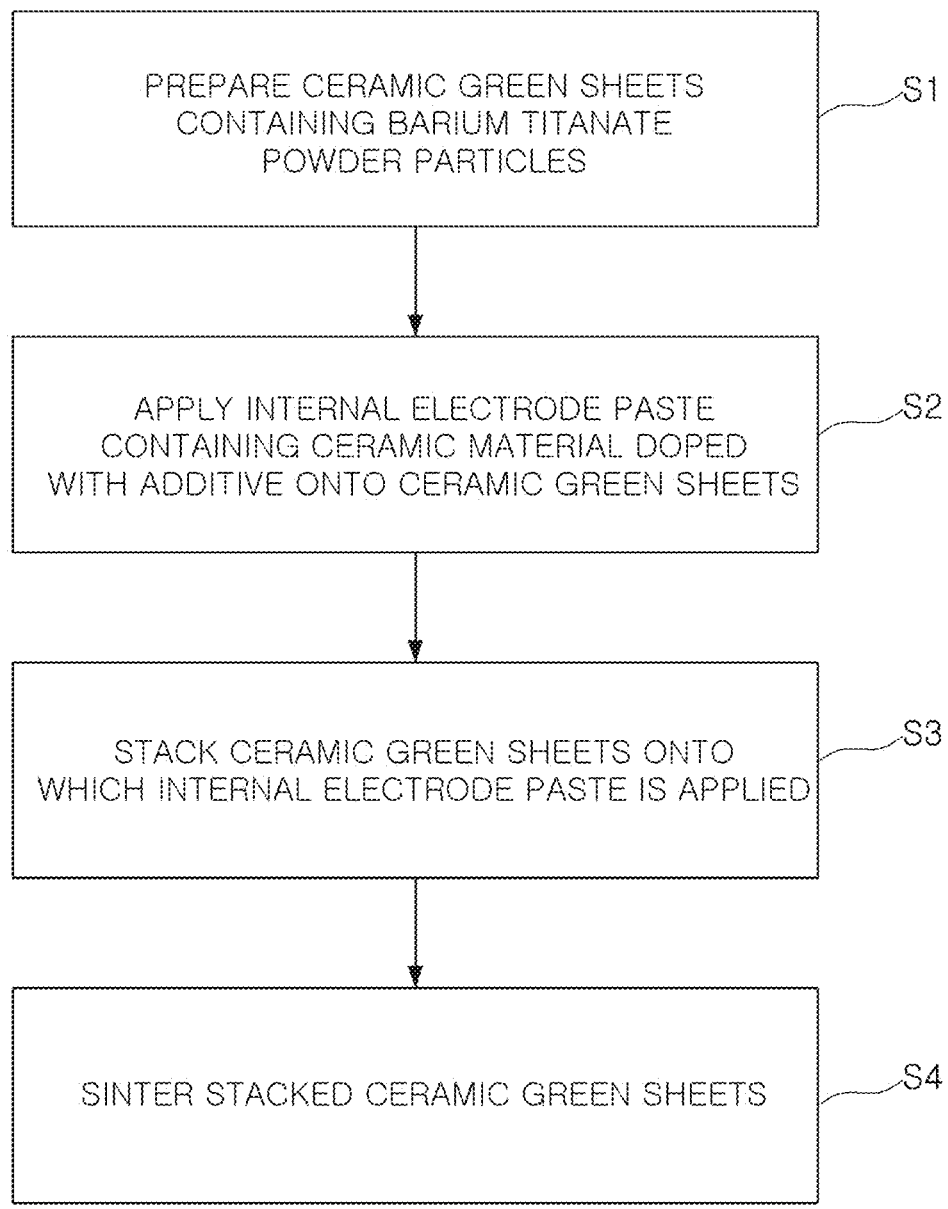
FIG. 5 is a flowchart illustrating a method of manufacturing a multilayer ceramic electronic component according to another exemplary embodiment of the present disclosure.

FIG. 5 is a flowchart illustrating a method of manufacturing a multilayer ceramic electronic component according to another exemplary embodiment of the present disclosure.

Referring to FIG. 5, the method of manufacturing a multilayer ceramic electronic component according to another exemplary embodiment of the present disclosure may include preparing ceramic green sheets containing barium titanate-based powder particles (S1), applying internal electrode paste containing a ceramic material doped with an additive to the ceramic green sheets (S2), stacking the ceramic green sheets to which the internal electrode paste is applied to form a multilayer body (S3), and sintering the multilayer body to prepare a ceramic body (S4).

In the preparing (S1) of the ceramic green sheets, the ceramic green sheets may be formed by applying dielectric slurry containing the barium titanate powder particles to carrier films and drying the slurry thereon.

The ceramic green sheet may not contain the additive contained in the ceramic material. Alternatively, the ceramic green sheet may contain a lower concentration of additive than that of the additive contained in the ceramic material, such that a concentration gradient may be formed in the dielectric layer after a sintering process.

According to the exemplary embodiment, the concentration of the additive for the dielectric base material contained in the ceramic material may be higher than that of the additive for the dielectric base material contained in the dielectric slurry forming the ceramic green sheet.

The internal electrode paste may be applied to the ceramic green sheets (S2) by printing the internal electrode paste for forming the internal electrode patterns on the ceramic green sheets. However, a method of forming the internal electrode patterns is not limited thereto.

The internal electrode paste may contain an electrode material such as nickel (Ni), copper (Cu), palladium (Pd), or an alloy thereof, but is not limited thereto.

According to the exemplary embodiment, the internal electrode paste may contain the ceramic material including the dielectric material doped with the additive depending on physical properties required in the dielectric layer.

The additive may include at least one selected from the group consisting of calcium (Ca), the valence acceptor elements, and the rare earth elements.

For example, the ceramic material may be a barium titanate doped with calcium ($Ba_{1-x}Ca_xTiO_3$). Here, x satisfies $0.01 \leq x \leq 0.2$, but is not limited thereto.

According to the exemplary embodiment, the ceramic material contained in the internal electrode paste may have a particle size of 1 to 50 nm, preferably, 1 to 30 nm.

In a case in which the particle size of the ceramic material is less than 1 nm, an effect of suppressing necking between conducive particles (for example, nickel particles) contained in the internal electrode paste is insignificant in the sintering process, whereby the connectivity of the internal electrodes may be decreased.

In addition, when the average particle size of the ceramic material exceeds 50 nm, the ceramic material contained in the internal electrode paste is rapidly moved to the interfaces between the internal electrodes and the ceramic green sheets in the sintering process, such that it may not serve to effectively suppress the sintering of the internal electrodes, whereby the connectivity of the internal electrodes may be decreased.

When the average particle size of the ceramic material is 1 to 50 nm, the connectivity of the internal electrodes may be improved, whereby dielectric characteristics of the multilayer ceramic electronic component may be improved.

The ceramic material which is not moved to the interfaces in the sintering process may remain in the internal electrodes. The ceramic material trapped and remaining in the internal electrodes after the sintering process may have an average particle size of 1 to 200 nm due to particle growth of the ceramic material during the sintering process. In certain embodiments, the ceramic material my have an average particle size of 1 to 100 nm.

Next, the ceramic green sheets on which the internal electrode patterns are formed may be stacked to form the multilayer body (S3). In addition, at least one ceramic green sheet on which no internal electrode pattern is formed may be stacked on upper and lower surfaces of the multilayer body in which the ceramic green sheets on which the internal electrode patterns are formed, in order to form upper and lower cover parts.

Next, the multilayer body may be sintered to form the ceramic body including the internal electrodes and the dielectric layers (S4).

According to the exemplary embodiment, the method of manufacturing a multilayer ceramic electronic component may further include, before the sintering of the multilayer body, compressing the multilayer body and cutting the compressed multilayer body into individual chips so that one ends of the internal electrode patterns are alternately exposed through cut surfaces of the multilayer body.

According to the exemplary embodiment, in the sintering of the multilayer body, a portion of the ceramic material contained in the internal electrode paste may escape from the internal electrode paste to the interfaces between the internal electrodes and the ceramic green sheets to form portions of the dielectric layers together with the ceramic green sheets.

Therefore, the concentration of the additive may be higher in the interface portions of the dielectric layer than in the central portion of the dielectric layer.

According to the exemplary embodiment, a sintering profile may be controlled, such that 20 to 80% of the ceramic material contained in the internal electrode paste escapes from the internal electrode paste in the sintering process to form portions (mainly the interface portions) of the dielectric layer and the remainder of the ceramic material may remain in the internal electrodes.

For example, a temperature may be rapidly raised in predetermined sections of the sintering process to allow the ceramic material contained in the internal electrode paste to smoothly escape from the internal electrode paste to the interfaces using a difference in sintering rates between the electrode material and the ceramic material contained in the internal electrodes.

Figure 6:
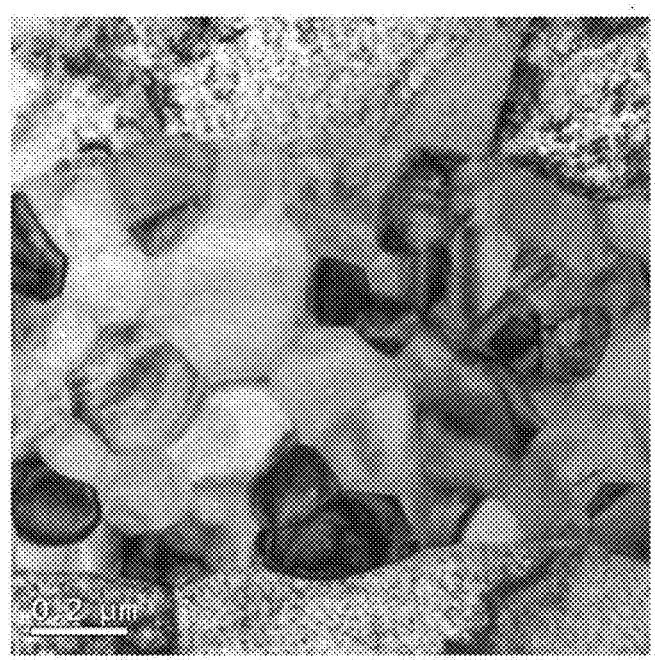
FIG. 6 is a transmission electron microscopy (TEM) image of a cross-section of a sintered multilayer body including internal electrodes and dielectric layers according to the exemplary embodiment of the present disclosure.

FIG. 6 is a transmission electron microscope (TEM) image of a cross-section of the sintered multilayer body including the internal electrodes and the dielectric layers.

In the sintering process, the ceramic material contained in the internal electrode paste may move to the interfaces between the internal electrodes and the dielectric layer.

It may be confirmed in FIG. 6 that after the sintering process is completed, the dielectric material doped with the additive forming the ceramic material is absorbed by the shell portions of the dielectric grains contained in the ceramic green sheet to form a portion of the dielectric layer.

Next, the external electrode paste may be applied to the outer surfaces of the ceramic body to form the external electrodes. The external electrode paste may be applied to the outer surfaces of the ceramic body by dipping the ceramic body in the external electrode paste, but the method of forming the external electrodes is not limited thereto.

According to the exemplary embodiment, the external electrode paste may include nickel (Ni), copper (Cu), palladium (Pd), gold (Au), silver (Ag), or an alloy thereof, but is not limited thereto.

The external electrodes may be formed by sintering the external electrode paste applied onto the ceramic body.

A description of the method for manufacturing a multilayer ceramic electronic component according to the present exemplary embodiment, which overlaps with that of the multilayer ceramic electronic component according to the previous exemplary embodiment, will be omitted.

EXPERIMENTAL EXAMPLE

Inventive Example 1

Internal electrode paste containing BCT powder particles ($Ba_{0.9}Ca_{0.1}TiO_3$) doped with 10% calcium (Ca) was prepared. Meanwhile, an organic solvent such as a sintering aid, a binder, ethanol, and the like, was added to and wet-mixed with a dielectric raw material containing barium titanate ($BaTiO_3$) powder particles to prepare dielectric slurry. Then, the dielectric slurry was applied to and dried on carrier films to form ceramic green sheets.

Next, the internal electrode paste containing the BCT powder particles as a ceramic material was printed on the ceramic green sheets. The ceramic green sheets on which internal electrode patterns were formed were stacked to form a multilayer body, and the multilayer body was compressed and cut.

Next, the cut multilayer body was heated to remove the binder and was sintered under a high-temperature reduction atmosphere to forma ceramic body. The temperature was rapidly raised in predetermined sections of the sintering process to allow the BCT powder particles (the ceramic material) present in the internal electrode paste to move to interfaces between internal electrodes and dielectric layers as the internal electrodes were sintered. After the BCT powder particles moved to the interfaces, the ceramic green sheets were rapidly sintered so that the BCT powder particles that moved to the interfaces between the internal electrodes and the ceramic green sheets were prevented from diffusing to central portions of the dielectric layers.

External electrode paste containing glass frit and copper was applied onto both end surfaces of the ceramic body obtained by the above-mentioned method and was then sintered to form external electrodes connected to the internal electrodes.

Comparative Example 1

Internal electrode paste containing $BaTiO_3$ (hereinafter, referred to as BT) powder particles that were not doped with calcium (Ca) as a ceramic material was prepared. All conditions were the same as those of Inventive Example 1, except that the BT powder particles, instead of the BCT powder particles, were mixed with the internal electrode paste as the ceramic material.

Comparative Example 2

Ceramic green sheets were manufactured using BCT powder particles that were doped with 3% calcium (Ca) as a dielectric raw material. All other conditions were the same as those of Comparative Example 1.

Figure 7A:
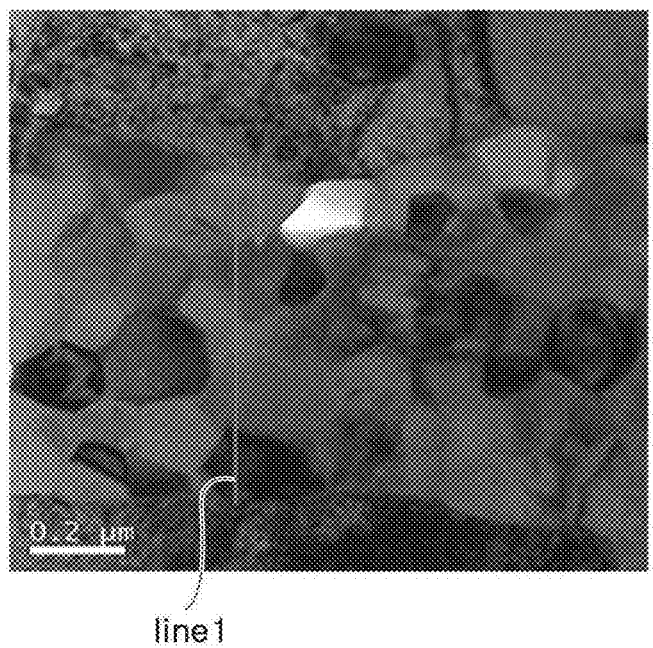
FIG. 7A is a TEM image of a cross-section of a multilayer ceramic electronic component including internal electrodes and dielectric layers according to Inventive Example 1.
Figure 7B:
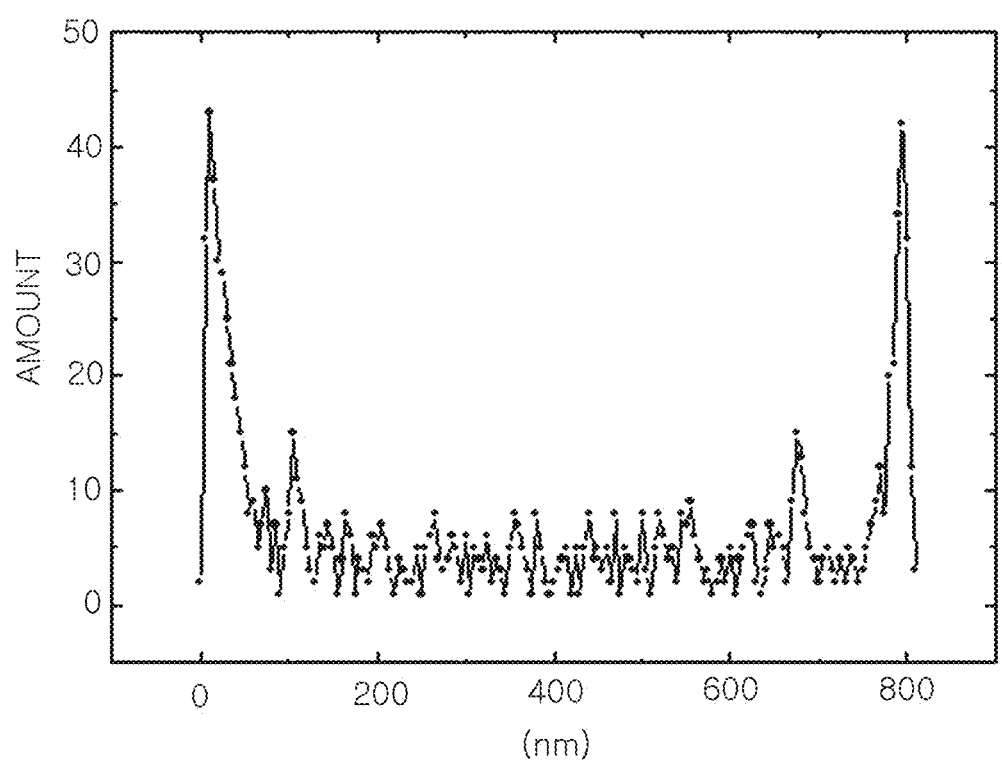
FIG. 7B is a graph illustrating an energy dispersive spectroscopy (EDS) line profile indicating an amount of calcium (Ca) present in a region defined by line 1 of FIG. 7A in the direction of an arrow therein.

First, FIG. 7A is a TEM image of the cross section of the multilayer ceramic electronic component including the internal electrodes and the dielectric layers according to Inventive Example 1; and FIG. 7B is a graph illustrating an energy dispersive spectroscopy (EDS) line profile indicating an amount of calcium (Ca) present in a region defined by line 1 of FIG. 7A analyzed in the direction of an arrow therein. It may be confirmed in FIG. 7B that in the multilayer ceramic electronic component according to Inventive Example 1, a large amount of calcium (Ca) was found in interface portions of the dielectric layer adjacent the internal electrodes while a small amount of calcium (Ca) was found in a central portion of the dielectric layer.

The following Table 1 illustrates data obtained by measuring dielectric constant (relative dielectric constant), dielectric loss factor (DF), and break-down voltage (BDV) of the multilayer ceramic electronic components manufactured according to Inventive Example 1, Comparative Example 1, and Comparative Example 2.

The dielectric constants and the dielectric loss factors were measured at room temperature under conditions of 1 KHz and 1V at Agilent 4284A. The BDVs were measured using a Keithely measurer. Here, a voltage value at a point at which a current value reached 10 mA while an applied voltage value was increased by 1.00000V from 0V in a sweep scheme was measured as a BDV value.

TABLE 1

| Sample | Dielectric Constant | DF (%) | BDV (V) |
|---|---|---|---|
| Inventive Example 1 | 3621 | 4.59 | 69.25 |
| Comparative Example 1 | 3520 | 4.2 | 61.36 |
| Comparative Example 2 | 3608 | 4.93 | 68.83 |

Referring to Table 1, it can be seen that the dielectric constant was higher in Inventive Example 1 in which the content of calcium (Ca) was high in the interface portions of the dielectric layer adjacent the internal electrodes than in Comparative Example 1 in which calcium was not contained in the dielectric layer or Comparative Example 2 in which calcium was contained in the entirety of the dielectric layer. Therefore, it can be seen that the capacitance of the multilayer ceramic electronic component was increased in Inventive Example 1.

In addition, it can be seen that the dielectric loss factor (DF) was decreased in Inventive Example 1 as compared with Comparative Example 2 in which calcium was present in the entirety of the dielectric layer.

Further, it can be seen that the BDV was increased in Inventive Example 1 as compared with Comparative Example 1 in which calcium was not contained in the dielectric layer or Comparative Example 2 in which the calcium was present in the entirety of the dielectric layer.

Inventive Example 2

Internal electrode paste containing dysprosium (Dy)-doped BT powder particles ($Ba_{0.99}Dy_{0.01}TiO_3$) that were doped with 10% calcium (Ca) was prepared. Meanwhile, an organic solvent such as a sintering aid, a binder, ethanol, and the like, was added to and wet-mixed with a dielectric raw material containing barium titanate ($BaTiO_3$) powder particles to prepare dielectric slurry. Then, the dielectric slurry was applied to and dried on carrier films to form ceramic green sheets.

Next, the internal electrode paste containing the Dy-doped BT powder particles as a ceramic material was printed on the ceramic green sheets. The ceramic green sheets on which internal electrode patterns were formed were stacked to form a multilayer body, and the multilayer body was compressed and cut.

Next, the cut multilayer body was heated to remove the binder and was sintered under a high-temperature reduction atmosphere to forma ceramic body. The temperature was rapidly raised in predetermined sections of the sintering process to allow the Dy-doped BT powder particles (the ceramic material) present in the internal electrode paste to be moved to interfaces between internal electrodes and dielectric layers as the internal electrodes were sintered, and after the Dy-doped BT powder particles were pushed to the interfaces, the ceramic green sheets were rapidly sintered so that the Dy-doped BT powder particles moved to the interfaces between the internal electrodes and the ceramic green sheets were prevented from being diffused to central portions of the dielectric layers.

External electrode paste containing glass frit and copper was applied to both end surfaces of the ceramic body obtained by the above-mentioned method and was then sintered to form external electrodes connected to the internal electrodes.

Comparative Example 3

Internal electrode paste containing $BaTiO_3$ (hereinafter, referred to as BT) powder particles as a ceramic material that were not doped with dysprosium (Dy) was prepared. All conditions were the same as those of Inventive Example 2, except that the BT powder particles, instead of the Dy-doped BT powder particles, were mixed with the internal electrode paste as the ceramic material.

The following Table 2 illustrates data obtained by measuring dielectric constant (relative dielectric constant), dielectric loss factor (DF), and break-down voltage (BDV) of the multilayer ceramic electronic components manufactured according to Inventive Example 2 and Comparative Example 3.

The dielectric constants and the dielectric loss factors were measured at room temperature under conditions of 1 KHz and 1V at Agilent 4284A. The BDVs were measured using a Keithely measurer. Here, a voltage value at a point at which a current value reached 10 mA while an applied voltage value was increased by 1.00000V from 0V in a sweep scheme was measured as a BDV value.

TABLE 2

| Sample | Dielectric Constant | DF (%) | BDV (V) |
|---|---|---|---|
| Inventive Example 2 | 4012 | 4.1 | 70.1 |
| Comparative Example 3 | 3505 | 4.2 | 62.2 |

Referring to Table 2, it can be seen that the dielectric constant was higher in Inventive Example 2 in which the content of dysprosium (Dy) was higher in the interface portions of the dielectric layer adjacent the internal electrodes than in Comparative Example 3 in which dysprosium (Dy) was not contained in the dielectric layer. Therefore, it can be seen that the capacitance of the multilayer ceramic electronic component was increased in Inventive Example 2. In addition, it can be seen that the BDV was improved in Inventive Example 2 as compared with Comparative Example 3.

As set forth above, according to exemplary embodiments of the present disclosure, the multilayer ceramic electronic component having increased capacitance and improved reliability, and the method of manufacturing the same may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a plurality of dielectric layers non-uniformly containing a first additive; and
internal electrodes disposed on the dielectric layers and containing a ceramic material trapped therein,
wherein the ceramic material is a dielectric material doped with a second additive including a rare earth element.

2. The multilayer ceramic electronic component of claim 1, wherein the dielectric material is a barium titanate-based dielectric material doped with the second additive.

3. The multilayer ceramic electronic component of claim 1, wherein the second additive includes at least one selected from the group consisting of calcium (Ca), valence acceptor elements, and rare earth elements in addition to the rare earth element.

4. The multilayer ceramic electronic component of claim 1, wherein the dielectric material is co-doped with calcium (Ca) and more than one valence acceptor element.

5. The multilayer ceramic electronic component of claim 1, wherein the dielectric material is co-doped with at least one valence acceptor element and the rare earth element.

6. The multilayer ceramic electronic component of claim 1, wherein the dielectric material is co-doped with calcium (Ca) and the rare earth element.

7. The multilayer ceramic electronic component of claim 1, wherein the dielectric material is co-doped with calcium (Ca), at least one valence acceptor element, the rare earth element.

8. The multilayer ceramic electronic component of claim 1, wherein the first additive is the same as the second additive, and an average concentration of the second additive contained in the ceramic material is higher than that of the first additive contained in the dielectric layer.

9. The multilayer ceramic electronic component of claim 1, wherein the first additive is the same as the second additive, and a content of the first additive is higher in portions of the dielectric layer adjacent the internal electrodes than in a central portion of the dielectric layer in a thickness direction thereof.

10. The multilayer ceramic electronic component of claim 1, wherein a cross-sectional area of the internal electrodes occupied by the ceramic material is 3% to 20% of an overall cross-sectional area of the internal electrodes.

11. The multilayer ceramic electronic component of claim 1, wherein the ceramic material has an average particle size of 1 to 200 nm.

12. A multilayer ceramic electronic component comprising:
a ceramic body including dielectric layers; and
internal electrodes disposed on the dielectric layers within the ceramic body and containing a rare earth element doped ceramic material trapped therein,
wherein an additive in the dielectric layer has a concentration gradient in a thickness direction of the dielectric layer.

13. The multilayer ceramic electronic component of claim 12, wherein the dielectric layer includes interface portions adjacent the internal electrodes and a central portion disposed between the interface portions, and
a concentration of the additive is higher in the interface portions than in the central portion.

14. The multilayer ceramic electronic component of claim 12, wherein a concentration of the additive is gradually decreased from portions of the dielectric layer adjacent interfaces between the dielectric layer and the internal electrodes toward a central portion of the dielectric layer in the thickness direction thereof.

15. The multilayer ceramic electronic component of claim 12, wherein the additive includes at least one selected from the group consisting of calcium (Ca), valence acceptor elements, and rare earth elements including the rare earth element in the internal electrodes.

16. The multilayer ceramic electronic component of claim 12, wherein the ceramic material is a dielectric material doped with the rare earth element.

17. The multilayer ceramic electronic component of claim 12, wherein the ceramic material is a barium titanate-based dielectric material doped with the rare earth element.

18. The multilayer ceramic electronic component of claim 12, wherein the ceramic material is a dielectric material doped with at least one selected from the group consisting of calcium (Ca), valence acceptor elements, and rare earth elements in addition to the rare earth element in the internal electrodes.

19. The multilayer ceramic electronic component of claim 12, wherein the ceramic material is a dielectric material doped with the rare earth element, and an average concentration of the rare earth element contained in the ceramic material is higher than that of the additive contained in the dielectric layer.

20. The multilayer ceramic electronic component of claim 12, wherein a cross-sectional area of the internal electrodes occupied by the ceramic material is equal to 3% to 20% of an overall cross-sectional area of the internal electrodes.

21. The multilayer ceramic electronic component of claim 12, wherein the ceramic material has an average particle size of 1 to 200 nm.

22. A multilayer ceramic electronic component comprising:
a plurality of dielectric layers; and
internal electrodes disposed on the dielectric layers and containing a ceramic material trapped therein,
wherein the dielectric layer and the ceramic material contain a doping additive including a rare earth element, and the doping additive is non-uniformly contained in the dielectric layer, and
an average concentration of the doping additive contained in the ceramic material is higher than that of the doping additive contained in the dielectric layer.

23. The multilayer ceramic electronic component of claim 22, wherein the ceramic material is a dielectric material doped with the doping additive.

24. The multilayer ceramic electronic component of claim 22, wherein the dielectric layer includes interface portions adjacent the internal electrodes and a central portion disposed between the interface portions, and
a concentration of the doping additive is higher in the interface portions than in the central portion.

25. The multilayer ceramic electronic component of claim 22, wherein the doping additive includes at least one selected from the group consisting of calcium (Ca), valence acceptor elements, and rare earth elements in addition to the rare earth element.

26. A multilayer ceramic electronic component comprising:
a plurality of dielectric layers non-uniformly containing a first additive,
wherein the dielectric layers comprise a plurality of grains having a core-shell structure; and
internal electrodes disposed on the dielectric layers and containing a ceramic material trapped therein,
wherein the ceramic material is a dielectric material doped with a second additive including a rare earth element.

27. The multilayer ceramic electronic component of claim 26, wherein a content of the first additive in the dielectric grains is higher in shell portions of the core-shell structures than a content of the first additive in core portions of the core-shell structures.

28. The multilayer ceramic electronic component of claim 26, wherein the first additive is the same as the second additive.

29. The multilayer ceramic electronic component of claim 28, wherein the first additive includes at least one selected from the group consisting of calcium (Ca), valence acceptor elements, and rare earth elements in addition to the rare earth element.

30. The multilayer ceramic electronic component of claim 28, wherein an average concentration of the second additive contained in the ceramic material is higher than that of the first additive contained in the dielectric layer.

31. The multilayer ceramic electronic component of claim 28, wherein a content of the first additive is higher in portions of the dielectric layer adjacent the internal electrodes than in a central portion of the dielectric layer in a thickness direction thereof.

32. The multilayer ceramic electronic component of claim 26, wherein a cross-sectional area of the internal electrodes occupied by the ceramic material is 3% to 20% of an overall cross-sectional area of the internal electrodes.

33. The multilayer ceramic electronic component of claim 26, wherein the ceramic material has an average particle size of 1 to 200 nm.

34. The multilayer ceramic electronic component of claim 26, wherein each dielectric layer consists of a single layer of dielectric grains.

* * * * *